United States Patent
Walker et al.

(10) Patent No.: US 9,674,118 B2
(45) Date of Patent: Jun. 6, 2017

(54) SYSTEM AND METHOD FOR LOW-LATENCY NETWORK DATA SWITCHING

(71) Applicant: xCelor LLC, Chicago, IL (US)

(72) Inventors: Robert James Walker, Chicago, IL (US); Stefan Josef Gratzl, Chicago, IL (US); Sergey Sardaryan, Mississauga (CA); Vahan Sardaryan, Hinsdale, IL (US)

(73) Assignee: xCELOR LLC, Chicago, IL (US)

( * ) Notice: Subject to any disclaimer, the term of this patent is extended or adjusted under 35 U.S.C. 154(b) by 483 days.

(21) Appl. No.: 14/219,908

(22) Filed: Mar. 19, 2014

(65) Prior Publication Data

US 2015/0271106 A1    Sep. 24, 2015

(51) Int. Cl.
H04L 12/801    (2013.01)
H04L 12/935    (2013.01)
H04L 12/24    (2006.01)

(52) U.S. Cl.
CPC .............. H04L 49/30 (2013.01); H04L 47/10 (2013.01); H04L 12/24 (2013.01)

(58) Field of Classification Search
CPC ................. G06F 17/5027; H04L 12/24; H04L 2012/5679; H04L 47/10; H04L 47/2416
See application file for complete search history.

(56) References Cited

U.S. PATENT DOCUMENTS

| | | | | |
|---|---|---|---|---|
| 5,796,623 | A * | 8/1998 | Butts | G06F 17/5027 703/23 |
| 2001/0036181 | A1* | 11/2001 | Rogers | H04L 45/40 370/389 |
| 2006/0112188 | A1 | 5/2006 | Albanese et al. | |
| 2006/0146808 | A1* | 7/2006 | Campini | H04L 12/24 370/360 |
| 2007/0255886 | A1* | 11/2007 | Dao | G06F 15/7867 710/317 |
| 2012/0130919 | A1 | 5/2012 | Gaber et al. | |

(Continued)

FOREIGN PATENT DOCUMENTS

WO    2013155566 A1    10/2013

OTHER PUBLICATIONS

XCelor xPort, "Faster than a meter of fiber", dated Nov. 4, 2013, 15 pages.

(Continued)

Primary Examiner — Raj Jain
(74) Attorney, Agent, or Firm — Invention Mine LLC

(57) ABSTRACT

A digital networking system includes a digital crosspoint switch, a host controller, and a data processing card that includes a programmable logic device such as a field-programmable gate array (FPGA). The host controller is operative to configure both the data processing card and the digital crosspoint switch in accordance with commands received over a user interface. The system is configurable to direct incoming data through the crosspoint switch to the data processing card for processing, and then back through the crosspoint switch for distribution to one or more network ports. The processing performed by the data processing card may include, among other options, feed filtering of a digital market data feed for use in high-frequency trading applications.

20 Claims, 4 Drawing Sheets

(56) References Cited

U.S. PATENT DOCUMENTS

2015/0016243 A1* 1/2015 Haugen ................ H04L 49/557
                                                    370/220
2015/0271106 A1* 9/2015 Walker .................... H04L 49/30
                                                    370/419

OTHER PUBLICATIONS

Vitesse, VSC3172, "6.5 Gbps 72 x 72 Asynchronous Crosspoint Switch", www.vitese.com, dated 2006, 2 pages.

* cited by examiner

400 — $ xpmcli
402 — +XPM #
404 — +XPM # group Saturn
406 — Saturn: add eth20-22, eth27
408 — Saturn: master eth27
410 — Saturn: crossover eth21
412 — Saturn: exit
414 — +XPM # symgroup create ETF
ETF: add SPY, VOO, EEM
416 — ETF: exit
418 — +XPM # symgroup create stocks
stocks: add MSFT, GOOG, APPL
stocks: exit
420 — +XPM # group Saturn
422 — Saturn: add eth28-29 symgroup ETF
Saturn: add eth30 symgroup stocks
Saturn: exit
+XPM # quit
$

Fig. 4

SYSTEM AND METHOD FOR LOW-LATENCY NETWORK DATA SWITCHING

BACKGROUND

This disclosure relates to digital networking, specifically to the replication and switching of digital data signals over a network.

A great number of business transactions are conducted over digital networks, including transactions involving the purchase and sale of securities. Such transactions generate a large and ever increasing amount of raw real-time data. For example, digital market data information from the NAS-DAQ securities market can reach data rates on the order of 2 Gb/s at peak trading hours. The handling of such large streams of data introduces competing challenges. Most computing systems do not have sufficient power to process the entirety of the data generated in the electronic marketplace. Consequently, it is desirable for individual clients to receive processed data that includes only the information important to their own needs. However, the time needed to process this data can introduce significant and often unpredictable non-deterministic delays in the client's receipt of the data. Particularly in the case of clients performing high-frequency trading (HFT) of exchange-traded securities, even delays on the order of microseconds can lead to trading losses that could otherwise have been avoided if electronic switching latencies were reduced. To improve the efficiency of electronic business transactions, it is desirable to minimize any delays introduced by transmission, switching, and processing of data transmitted over a network.

SUMMARY

In an embodiment of the system described herein, a networking apparatus includes a digital crosspoint switch (which may be a solid state crosspoint chip), a data processing card, and a host controller. The digital crosspoint switch includes a plurality of crosspoint ports, including a set of internal crosspoint ports and a set of external crosspoint ports. The digital crosspoint switch also includes a crosspoint control interface through which the digital crosspoint switch can be configured.

The data processing card has at least one data processing input port and at least one data processing output port. These data processing ports are connected to respective internal crosspoint ports. The data processing card includes a programmable logic device, such as a field programmable gate array (FPGA). The programmable logic device is operable to process data received on the data processing input port and to output processed data on the data processing output port. The data processing card includes a logic control interface through which the programmable logic device is configurable.

The host controller is connected to both the crosspoint control interface and the logic control interface. The host controller includes a processor and a non-transitory computer-readable medium that stores executable management instructions. These executable management instructions, when executed on the processor, are operative to configure the digital crosspoint switch over the crosspoint control interface and to configure the data processing card over the logic control interface. In some embodiments, the programmable logic device is configured by sending FPGA instructions over the logic control interface.

BRIEF DESCRIPTION OF THE DRAWINGS

FIG. 4 is a schematic illustration of a command-line user interface implemented in some embodiments.

DETAILED DESCRIPTION

A. Overview of an Exemplary Embodiment

Figure 1:
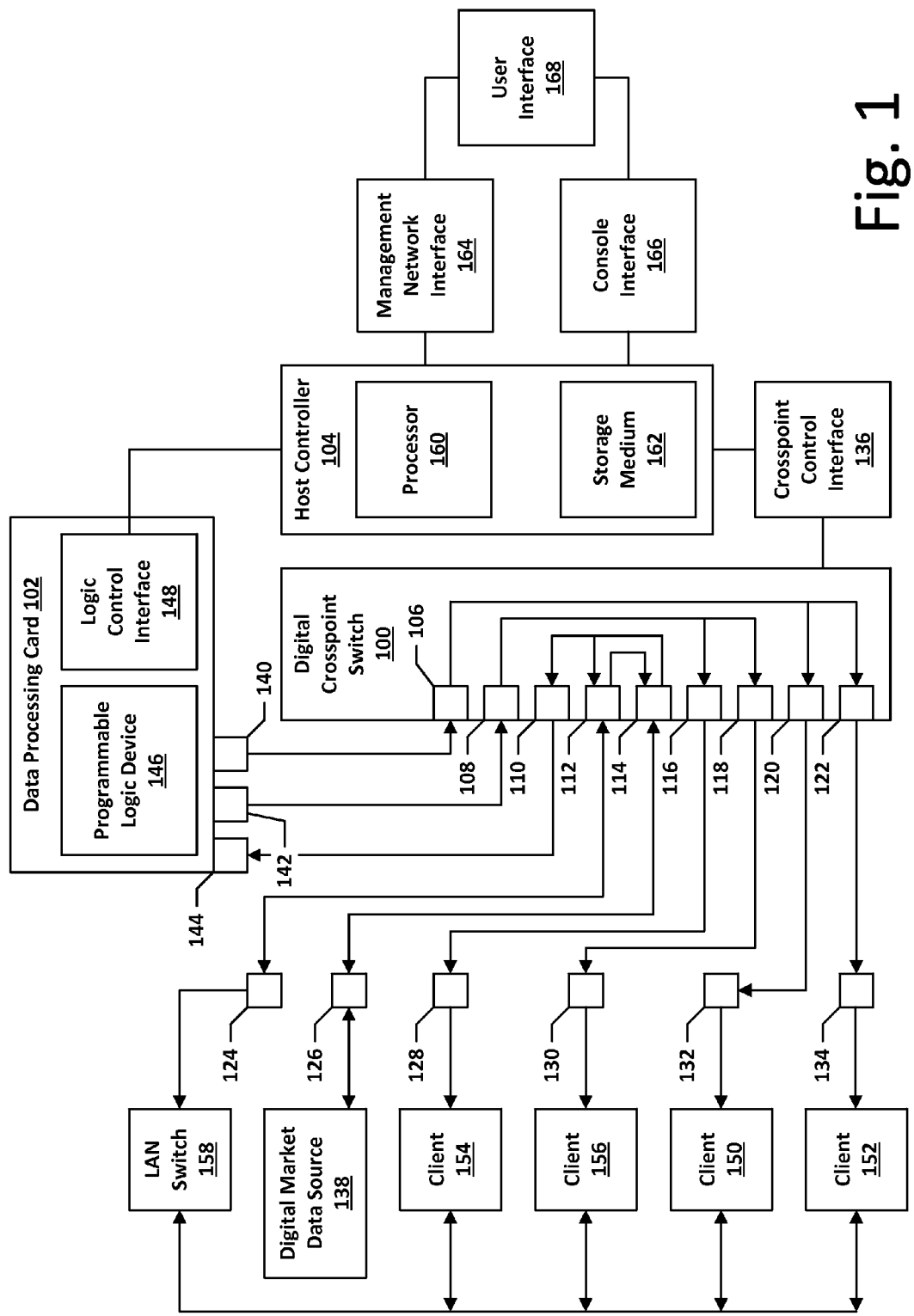
FIG. 1 is a schematic functional block diagram of the architecture of a network switching system according to some embodiments.

In one exemplary embodiment illustrated in FIG. 1, a network switching apparatus includes a digital crosspoint switch 100, a data processing card 102, and a host controller 104. The digital crosspoint switch includes a plurality of crosspoint ports 106, 108, 110, 112, 114, 116, 118, 120, and 122. In this example, three of the crosspoint ports, 106, 108, and 110 are connected to the data processing card 102 and are referred to herein as internal crosspoint ports. Six of the crosspoint ports 112, 114, 116, 118, 120, and 122 are connected to respective transceivers 124, 126, 128, 130, 132, 134 that allow connection with a data network such as a local area network (LAN) or a wide area network (WAN). Crosspoint ports 112, 114, 116, 118, 120, and 122 are referred to herein as external crosspoint ports. It should be noted that the terms "internal crosspoint ports" and "external crosspoint ports" are used herein as a matter of labeling, and those different terms do not necessarily imply that that "internal crosspoint ports" and "external crosspoint ports" are functionally different from one another from the perspective of the digital crosspoint switch 100.

The connection between transceivers 124, 126, 128, 130, 132, 134 and their respective crosspoint ports 112, 114, 116, 118, 120, and 122 may be made using interfaces such as SFI and XFI, among other alternatives.

The digital crosspoint switch 100 is operative to replicate data received at one crosspoint port onto one or more other selected crosspoint ports. The digital crosspoint switch 100 is in communication with a crosspoint control interface 136 through which the configuration of the digital crosspoint switch 100 is controlled by selective mapping of ports. In the example illustrated in FIG. 1, data received at crosspoint port 106 is replicated to ports 120 and 122; data received at port 108 is replicated both to port 116 and to port 118; data received at port 112 is replicated to port 114; and data received at port 114 is replicated to ports 110 and 112. It should be noted that the mapping of ports is not necessarily symmetrical. For instance, data received at port 108 is replicated to port 116, but data received at port 116 is not necessarily replicated to port 108. Some ports, such as port 114, may be configured to accommodate the bidirectional flow of data, while other ports, such as ports 116 and 112, may be configured to accommodate only a unidirectional flow of data. While the foregoing describes one exemplary configuration of the digital crosspoint switch 100, the configuration of the digital crosspoint switch 100 may be changed by sending configuration instructions to the crosspoint control interface 136.

Depending on how the digital crosspoint switch 100 is configured, data received on one or more of the external crosspoint ports may be directed to the data processing card 102 for processing. The results of the data processing may then be fed back into the digital crosspoint switch 100 to be replicated at one or more external crosspoint ports.

To perform the data processing, the data processing card 102 includes a programmable logic device 146, such as a field-programmable gate array (FPGA). The data processing card 102 is configurable through a logic control interface 148, through which the data processing card 102 receives program instructions and/or parameters for the programmable logic device 142. The data processing card includes a plurality of data processing ports 140, 142, and 144. It should be noted that embodiments may include additional ports, but for simplicity, only ports 140, 142, and 144 are illustrated here. Data processing ports 140, 142, and 144 are connected to respective internal crosspoint ports 106, 108, 110.

In the example of FIG. 1, transceiver 126 is connected over a data network to a digital market data source 138, which provides a digital market data feed to the transceiver 126. The digital market data feed may be, for example, a feed from the NASDAQ exchange in the ITCH format, or a feed from the New York Stock Exchange in the XDP format. In one example illustrating the operation of the system of FIG. 1, a digital market data feed is sent as a series of UDP (User Datagram Protocol) packets. These UDP packets may themselves be encapsulated with an Ethernet frame.

In embodiments that make use of a digital market data feed, the data processing card 102 may perform a variety of different data processing operations. For example, the data processing card 102 may receive the market data feed on data processing port 144, which is being used as a data processing input port. After processing by the programmable logic device 146, one or more processed market data feeds may then be output to data processing ports 140 and 142, which are being used as data processing output ports. It should be noted that the terms "data processing input port" and "data processing output port" are label used for ease of understanding and do not necessarily reflect differences in hardware. For example, data processing port 144 may act as an input data processing port in some configurations of the system (such as the configuration illustrated in FIG. 1), but the same port could act as a data processing output port in other configurations.

One example of a processing operation that can be performed by the data processing card 102 is feed filtering. In this example, the data processing card 102 receives on data processing port 144 a digital market data feed consisting of a series of UDP packets. The programmable logic device 146 identifies the packets that satisfy a first predetermined filtering criterion, and the packets that satisfy that first criterion are output on a first data processing output port 140. The programmable logic device 146 also identifies the packets that satisfy a second predetermined filtering criterion, and the packets that satisfy that second criterion are output on a second data processing output port 142. As part of determining whether a UDP packet satisfies a predetermined filtering criterion, the programmable logic device 146 may determine whether the packet includes one or more preselected symbols representing particular securities that are traded on the market, such as stock symbols (e.g. MSFT, GOOG) or symbols for exchange-traded funds (e.g. SPY, VOO).

As an example of one possible operation of the system of FIG. 1, a digital market data feed is received from the digital market data source 138 at transceiver 126, which in turn is connected to external crosspoint port 114. In this example, external crosspoint port 114 is referred to as a master port. The digital crosspoint switch 100 is configured to replicate the market data feed at internal crosspoint port 110. The internal crosspoint port 110 is connected to a data processing input port 144 of the data processing card 102. The programmable logic device 146 processes the digital market data feed (e.g., by filtering) to generate two processed market data feeds. The first processed market data feed is output on a first data processing output port 140, and the second processed market data feed is output on a second data processing output port 142.

As for the first processed market data feed (from data processing output port 140), it is received by the digital crosspoint switch 100 at internal crosspoint port 106. In this example, the digital crosspoint switch 100 is configured to replicate the first processed market data feed at two of the external crosspoint ports, port 120 and port 122, which are connected to respective transceivers 132 and 134. These transceivers send the first processed market data feed over a data network to respective clients 150, 152.

As for the second processed market data feed (from data processing output port 142), it is received by the digital crosspoint switch 100 at internal crosspoint port 108. In this example, the digital crosspoint switch 100 is configured to replicate the first processed market data feed at two of the external crosspoint ports, port 116 and port 118, which are connected to respective transceivers 128 and 130. These transceivers send the first processed market data feed over a data network to respective clients 154, 156.

Thus, in the operation of the exemplary system of FIG. 1, a digital market data feed is processed to generate different processed market data feeds that are disseminated to different clients according to the needs of those clients. As will be apparent to those skilled in the art, the system can be reconfigured to process additional digital market data feeds to generate still more processed market data feeds for additional clients.

In the operation of this exemplary system, market data makes two passes through the digital crosspoint switch 100. The data passes through the crosspoint switch both on its way to the data processing card 102 and on its way from the data processing card 102. In this architecture, a greater number of crosspoint ports are required to serve as internal crosspoint ports, leaving fewer ports available to serve as external crosspoint ports (or requiring use of a larger crosspoint switch). However, this architecture leads to much greater flexibility in the configuration of the system, particularly as the market data can be replicated both before and after processing by the data processing card 102.

The digital crosspoint switch 100 may also be configured to replicate the unprocessed digital market data feed. In the example of FIG. 1, the digital market data feed is replicated at external crosspoint port 112 without being processed by the data processing card 102.

In the example of FIG. 1, a LAN switch 158, such as a layer 2/3 switch, provides a data path back to the digital market data source 138 from the clients 150, 152, 154, and 156. Packet data originating from a client passes through the LAN switch 158 to transceiver 124, which in turn is connected to external crosspoint port 112. Data received at port 112 is then replicated by the digital crosspoint switch 100 to crosspoint port 114, from which it passes through transceiver 126 to the digital market data source 138. In this example, port 112 is referred to as a crossover port.

The configuration of the digital crosspoint switch is performed by the host controller 104 in accordance with instructions received by a user. The host controller 104 includes a processor 160 and a non-transitory computer-readable storage medium 162. The storage medium 162 stores executable management instructions that, when executed on the processor, are operative to configure the digital crosspoint switch 100 over the crosspoint control interface 136 and to configure the programmable logic device 146 over the logic control interface 148. The host controller 104 can receive user instructions through a variety of access points. For example, the host controller of FIG. 1 is provided with a management network interface 164 through which a user can log on over a computer network. As an alternative, or in addition, to the management network interface, the host controller 104 may further include a console interface 166, through which a user can connect a keyboard and a computer monitor. As a further feature, the host controller 104 may be provided with a serial port (not illustrated), which a user can access using a null modem cable. Under the direction of the executable management instructions, the host controller 104 provides a user interface 168, such as a command-line interface, through which the user provides instructions regarding the configuration of the system. In accordance with the user instructions, the host controller 104 configures the data processing card 102 through the logic control interface 148 and configures the digital crosspoint switch 100 through the crosspoint control interface 136.

While the foregoing example illustrates the processing of a single market data feed, the system allows for the simultaneous processing and/or replication of multiple market data feeds using the principles described above.

B. Exemplary Hardware Implementation

Figure 2:
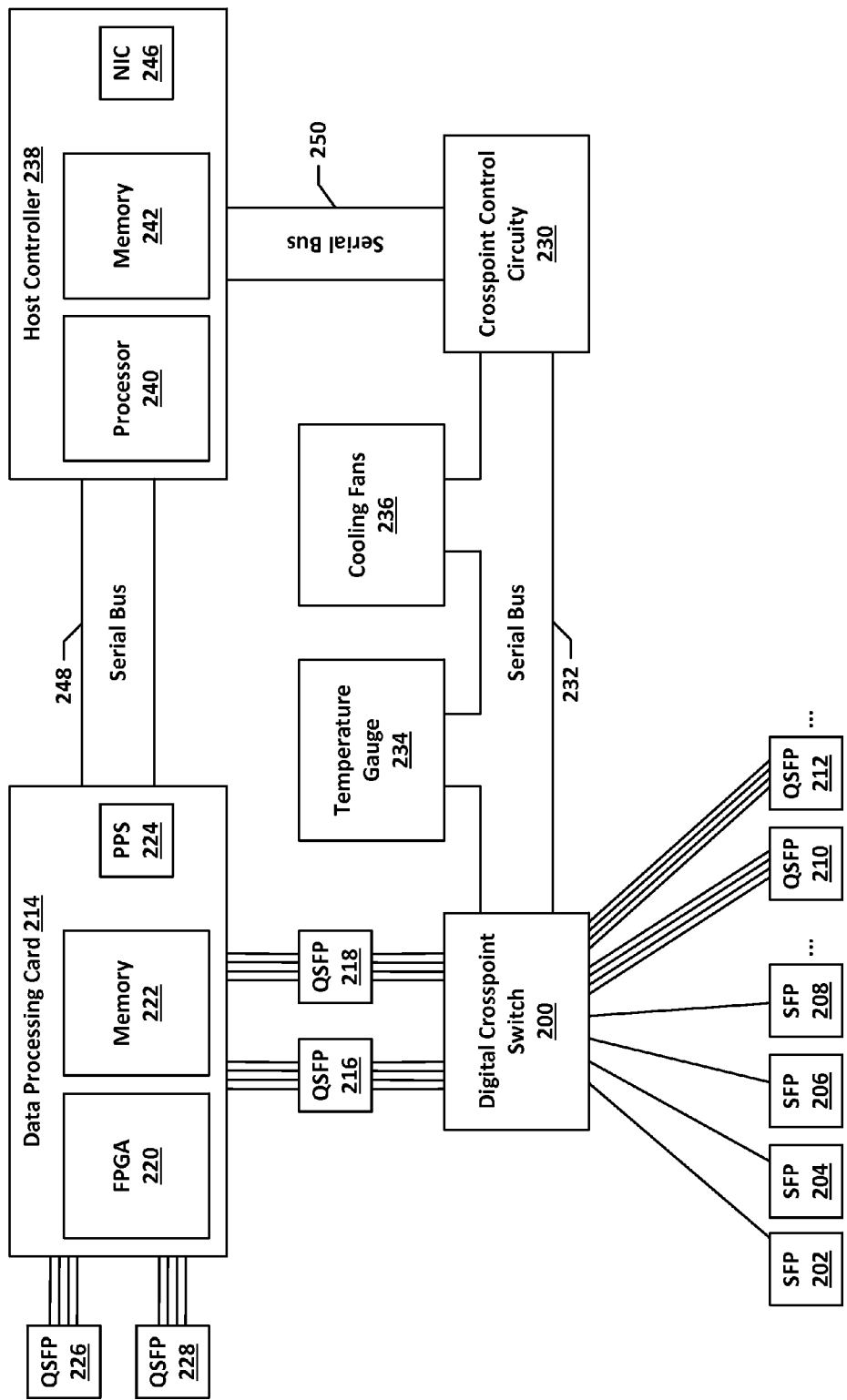
FIG. 2 is a schematic functional block diagram of the architecture of a network switching system according to some embodiments.

The hardware architecture of an exemplary embodiment is illustrated in FIG. 2. A digital crosspoint switch 200 is connected to several external network interfaces, including Small Form-Factor Pluggable (SFP) transceivers 202, 204, 206, and 208, and Quad Small Form-Factor Pluggable (QSFP) transceivers 210, 212. In some embodiments, the system includes thirty-two SFP transceivers and four QSFP transceivers. Preferably, these SFP and QSFP transceivers are accessible on the front panel of a rack mount unit. The system further includes a data processing card 214 connected to the digital crosspoint switch 200 through internal QSFP-like interfaces 216 and 218, each of which preferably conveys four 10 Gb Ethernet signals. Internal interfaces 216 and 218 may make use of Samtec connectors. Preferably, each of the SFP interfaces supports Ethernet connections with a range of speeds, including 10 Mb, 100 Mb, 1 Gb, and 10 Gb Ethernet. While the use of SFP and QSFP transceivers is described herein by way of example, it should be noted that the use of SFP+ and QSFP+ transceivers is also contemplated in some embodiments.

Each of the SFP interfaces 202, 204, 206, 208 is connected to a respective external port of the digital crosspoint switch 200. Each of the QSFP interfaces 210, 212, 216, 218 is connected to a respective set of four external ports of digital crosspoint switch 200. And each of the internal QSFP interfaces 216 and 218 is connected to a respective set of four internal ports of the digital crosspoint switch 200. Consequently, in a system with 32 external SFP interfaces, four external QSFP interfaces, and two internal QSFP interfaces, a total of fifty-six crosspoint ports are employed. In one embodiment, the digital crosspoint switch is a 72-port asynchronous crosspoint switch that supports random-access programming of each input and output port, such that each data output can be programmed to connect to any one of the inputs. Unused ports can be powered down for energy efficiency. An appropriate crosspoint switch is available from Vitesse Semiconductor.

The data processing card 214 is provided with a high-performance FPGA 220. Appropriate FPGAs for use in the data processing card 214 include those in the Stratix V line from Altera Corporation. The data processing card 214 further includes a memory 222 and preferably includes a Pulse-Per-Second (PPS) input 224 for use in time stamping applications. The data processing card 214 may include additional QSFP interfaces 226, 228.

The system of FIG. 2 further includes crosspoint control circuitry 230. Crosspoint control circuitry 230 may be implemented by a FPGA, although the FPGA of the crosspoint control circuitry 230 need not have as high performance as that of FPGA 220. Appropriate FPGAs for use in the crosspoint control circuitry 230 include those available from Lattice Semiconductor. The crosspoint control circuitry 230 communicates with the digital crosspoint switch 200 through a serial bus 232, which may be an Inter-Integrated Circuit ($I^2C$) bus. The crosspoint controller circuitry 230 may also communicate with and/or control additional hardware in the system over the serial bus 232, such as temperature gauges 234 and cooling fans 236 to monitor and maintain the operating environment of the system.

In an exemplary embodiment, the host controller 238 is implemented as main board including a processor 240. In some embodiments, the processor 240 is an Intel Atom processor. Alternatively, the processor 240 may be an Intel Xeon or other processor. The host controller 238 further includes memory 242. In some embodiments, the host controller 238 is configured to run a Linux Ubuntu kernel.

The host controller further includes a network interface 246, which may be on the main board or may be a separate Network Interface Controller (NIC), through which the host controller 238 receives user instructions. The NIC 246 may be a 1 Gb Ethernet connection.

The host controller 238 communicates with the data processing card 214 through a serial bus 248, which may be a Peripheral Component Interconnect Express (PCI Express) bus. The host controller 238 communicates with the crosspoint control circuitry 230 through a serial bus 250. In some embodiments, serial bus 250 is a Universal Serial Bus (USB) connection.

C. Configurations of the Data Processing Card

The data processing card (FIG. 1, 102; FIG. 2, 214) can be configured to perform a variety of operations. One such operation is feed filtering. A complete digital market data feed can reach data rates on the order of 2 Gb/s, particularly near the opening and closing of a securities market. Such data rates cannot readily be processed by many computing systems, at least not without introducing significant processing latency. Consequently, it is useful for a client (or group of clients) to receive only the portion of the data feed that is relevant to that client (or group).

Figure 3:
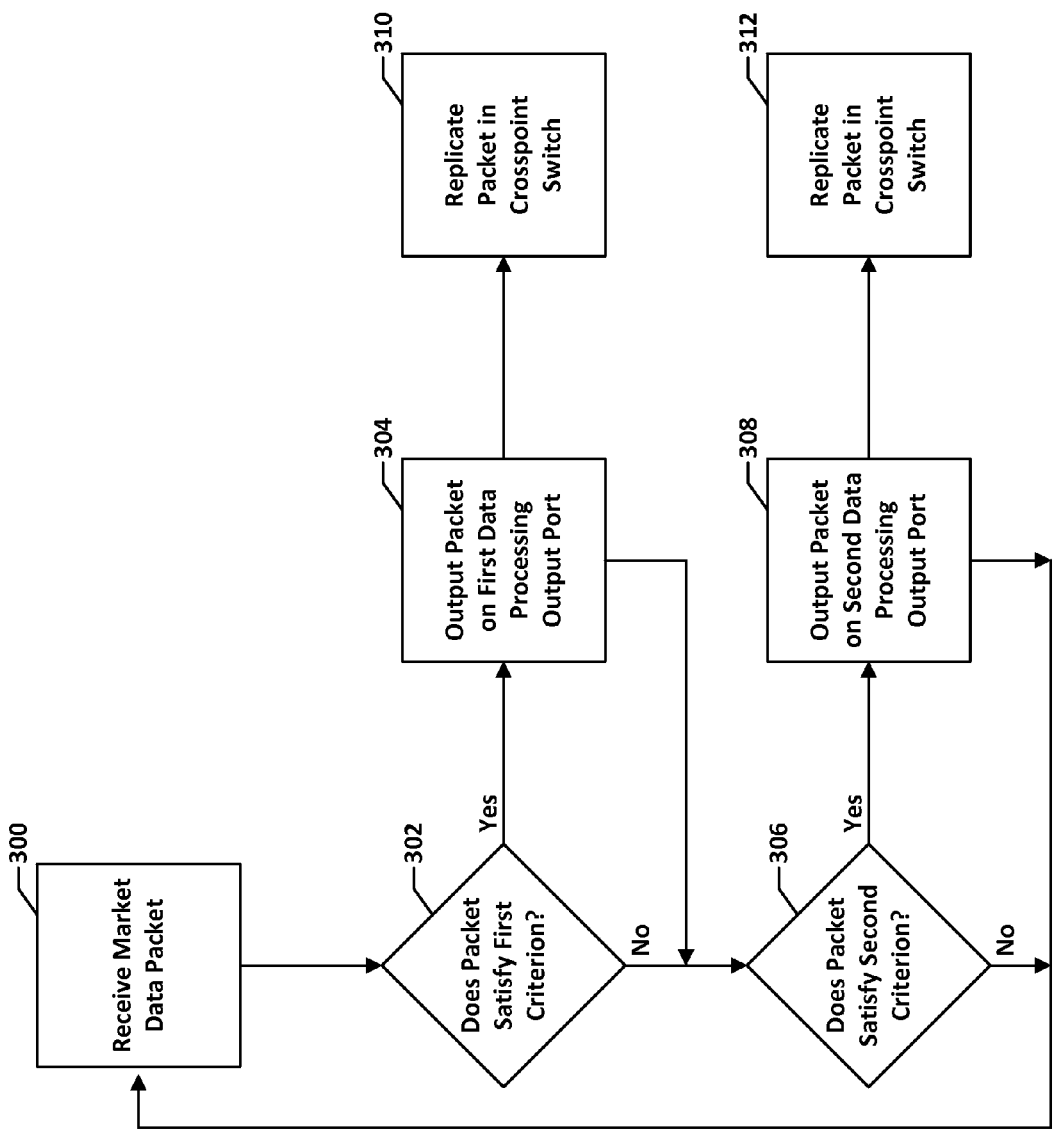
FIG. 3 is a flow diagram of a feed filtering process performed in some embodiments.

As illustrated in FIG. 3 the data processing card can be configured to perform feed filtering. In step 300, the data processing card receives, on a data processing input port, a network data packet that includes a market data message. In step 302, the data processing card determines whether the packet satisfies a first filtering criterion. If the packet satisfies the first filtering criterion, then in step 304, the packet is output on a first one of the data processing output ports. In step 306, the data processing card determines whether the packet satisfies a second filtering criterion. If so, then in step 308, the packet is output on a second one of the data processing output ports. The data processing card continues to process additional data packets as they arrive. The packets output on the different output ports constitute different processed market data feeds. The different processed market data feeds are then fed back through the digital crosspoint switch (steps 310, 312) to be replicated and sent to one or more clients.

Various criteria may be used when filtering the processed market data feeds. For example, the network data packets may include market data messages that include a security symbol, such as a symbol for a stock (e.g. MSFT, GOOG) or a symbol for an exchange-traded fund (e.g. SPY, VOO). The data processing card may store in its memory 222 a group of one or more symbols associated with each of the data processing output ports, and the data processing card may then output to each output port only those network data packets that include a symbol from the respective group.

Another criterion that may be used when performing feed filtering is to filter by metadata in the network data packet. For example, different clients may subscribe to different levels of service from a digital market data source, and they may not be entitled to receive all data from that data source. In such a case, packets many include information identifying different multicast groups, and the digital market data feed may be filtered such that clients receive only those packets pertaining to multicast groups to which they are entitled.

A different operation that can be performed by a data processing card is to perform time stamping. In such an operation, the data processing card combines time data from the PPS input 224 with network data packets received over a data processing input port to generate time-stamp data. This allows precise recording of the time at which a network data packet has been received and thus permits detection of any undue delay in the receipt of the digital market data feed.

Another operation that can be performed by the data processing card is feed normalization. Digital market data feeds are typically supplied in different protocols for different markets. The data processing card can be configured to convert the protocol of the digital market data feed; perhaps into a common, market-neutral format.

A further operation that may be performed by the data processing card is multiplexing of upstream data. Whereas, in the example of FIG. 1, a data path from the clients 150, 152, 154, and 156 back to the market data source 138 was provided through a separate LAN switch 158, an upstream data path may instead be provided through the data processing card 102. In such embodiments, data from the clients 150, 152, 154, and 156 is directed by the crosspoint switch 100 to the data processing card 102. The data processing card 102 is configured to multiplex data from the clients onto a single upstream data path to the market data source 138. In preforming this multiplexing operation, the data processing card 102 can make use of, for example, a round-robin scheduling algorithm. In embodiments that employ upstream data multiplexing by the data processing card 102, the upstream data path can be directed through the digital crosspoint switch 100 or through another route, such as through QSFP connectors 226 or 228 (FIG. 2).

In some embodiments, the configuration of the data processing card is performed by operation of the host controller sending FPGA program instructions to the FPGA 220 of the data processing card and/or by the host controller storing data in the memory 222 of the data processing card. For example, the FPGA may be configured through the use of FPGA program instructions to perform feed filtering, while information regarding the criteria used for feed filtering (e.g., groups of symbols associated with different data processing output ports) is stored in the memory 222. This allows the data processing card to be reconfigured by the host controller without requiring the FPGA 220 to be reprogrammed for every change in filtering criteria. For more significant changes in programming of the FPGA, e.g. for changes between a feed-filtering configuration and a time-stamping configuration, the host controller 238 configures the data processing card 214 by sending FPGA program instructions over the serial bus 248. In some embodiments, the host controller 238 retrieves FPGA program instructions over a computer network through its network interface controller 246 and reprograms the FPGA 220 by sending the FPGA program instructions over the serial bus 248.

D. Executable Management Instructions

The memory 242 (FIG. 2) of the host controller 238 stores executable management instructions that, when executed on the processor 240, are operative to provide a user interface for receiving user commands and to configure the digital crosspoint switch and the data processing card in response to the user commands. In some embodiments, the user interface is a command line interface that can be accessed through a management network interface 164 (FIG. 1), through a console interface 166, through a serial port, or by other means. The user interface may be an application program running in a Linux environment.

As an example of a command-line interaction with the host controller over the user interface is illustrated in FIG. 4. In step 400, at the "$" prompt of a Linux shell, the user evokes the command line user interface with the "xpmcli" command. The user interface then presents its own command-line interface with the prompt "+XPM #". In step 402, the user creates a port group labeled "Saturn" by using the "group [groupname]" command. This invokes a shell interface for the Saturn group using the prompt "Saturn:". In step 404, using the "add" command, the user adds Ethernet ports labeled eth20, eth21, eth22, and eth27 to the Saturn group. In step 406, using the "master" command, the user identifies the port labeled eth27 as the master port through which data for the Saturn group is received, such as port 114 of FIG. 1. As a consequence of the "master" command, the host controller configures the crossover switch to replicate data received at port eth27 on the remaining ports in the Saturn group, namely ports eth20, eth21, and eth22. In step 408, using the "crossover" command, the user identifies the port labeled eth21 as the crossover port that provides a return data path to the master port, such as port 112 of FIG. 1. As a consequence of the "crossover" command, the host controller configures the crossover switch to replicate data received at port eth21 onto the master port eth27. In step 410, the user exits the Saturn shell and returns to the "+XPM #" prompt.

To invoke the filtering capabilities of the data processing card, the user in step 412, creates a symbol group labeled "ETF" for electronically-traded funds. In step 414, the user adds the symbols SPY, VOO, and EEM to the ETF symbol group. In step 416, the user creates a symbol group labeled "stocks." In step 418, the user adds the symbols MSFT, GOOG, and APPL to the stocks group. In step 420, the user adds new ports eth28 and eth29 to the Saturn group and indicates that those ports are members of symbol group ETF. In step 422, the user adds new port eth30 to the Saturn group and indicates that it is a member of the "stocks" symbol group. As a result of the command enters in steps 420 and 422, the host controller configures the crossover switch to send data from the master port eth27 to the data processing card, and it configures the data processing card to provide two filtered outputs: one filtered output containing data that relates to the "stocks" group, and another filtered output that contains data relating to the ETF group. The host controller further configures the crosspoint switch to direct the filtered output for the "stocks" group to port eth30 and to direct the filtered output for the ETF group to ports eth28 and eth29.

Of course, in different embodiments, the commands may have different names or syntaxes. The user interface may be altered according to other known principles. For example, the user interface could be implemented as a web page or a graphical user interface.

The foregoing embodiments are described only as examples. As will be apparent to one of ordinary skill in the art, these examples can be modified, and other embodiments can be developed, without departing from the principles described in this disclosure.

The invention claimed is:

1. An apparatus comprising:
 a digital crosspoint switch having a crosspoint control interface and a plurality of crosspoint ports, wherein the plurality of crosspoint ports includes a set of internal crosspoint ports and a set of external crosspoint ports;
 a plurality of network interfaces connected to the external crosspoint ports;
 a data processing card including a programmable logic device, wherein the data processing card includes a logic control interface, a first data processing port connected to a first internal crosspoint port, and a second data processing port connected to a second internal crosspoint port; and
 a host controller connected to the crosspoint control interface and to the logic control interface, wherein the host controller includes a processor and a non-transitory computer-readable medium storing executable management instructions that, when executed on the processor, are operative:
  to configure the digital crosspoint switch to replicate input data from a first one of the network interfaces to the first data processing port;
  to configure the data processing card to process the input data and to generate first processed data on the second data processing port, wherein the input data comprises a digital market data feed comprising a plurality of market-data packets, and wherein generating the first processed data comprises only including market-data packets that meet a first predetermined filtering criterion in the first processed data; and
  to configure the digital crosspoint switch to replicate the first processed data from the second data processing port to at least a second one of the network interfaces.

2. The apparatus of claim 1, wherein the at least a second one of the network interfaces comprises a first plurality of the network interfaces.

3. The apparatus of claim 1, wherein the programmable logic device is a field programmable gate array (FPGA).

4. The apparatus of claim 3, wherein the management instructions, when executed on the processor, are further operative to direct the host controller to program the FPGA by sending FPGA program instructions over the logic control interface.

5. The apparatus of claim 3, further comprising a management network interface connected to the host controller, wherein the management instructions, when executed on the processor, are further operative to retrieve FPGA program instructions over the management network interface and to program the FPGA by sending the retrieved FPGA program instructions over the logic control interface.

6. The apparatus of claim 1, wherein the data processing card further comprises a third data processing port connected to a third internal crosspoint port, and wherein the management instructions, when executed on the processor, are further operative:
 to configure the data processing card to process the input data and to generate second processed data on the third data processing port; and
 to configure the digital crosspoint switch to replicate the second processed data from the third data processing port to at least a third one of the network interfaces.

7. The apparatus of claim 6, wherein generating the second processed data comprises only including market-data packets that meet a second predetermined filtering criterion in the second processed data.

8. The apparatus of claim 7, wherein the at least a second one of the network interfaces comprises a first plurality of the network interfaces.

9. The apparatus of claim 8, wherein the at least a third one of the network interfaces comprises a second plurality of the network interfaces.

10. The apparatus of claim 7, wherein:
 the first predetermined filtering criterion is that the market-data packets include each security symbol in a first predetermined group of one or more security symbols; and
 the second predetermined filtering criterion is that the market-data packets include each security symbol in a second predetermined group of one or more security symbols.

11. The apparatus of claim 1, wherein the management instructions, when executed on the processor, are further operative:
 to provide a user interface for receiving user commands; and
 to configure the data processing card and the digital crosspoint switch in accordance with the user commands.

12. The apparatus of claim 11, wherein the user interface is a command-line interface.

13. The apparatus of claim 1, wherein the first predetermined filtering criterion is that the market-data packets include each security symbol in a first predetermined group of one or more security symbols.

14. The apparatus of claim 1, wherein the first predetermined filtering criterion is that the market-data packets pertain to a predetermined multicast group.

15. The apparatus of claim 1, further comprising a plurality of transceivers, each transceiver having an external transceiver interface and an internal transceiver interface, wherein each of the internal transceiver interfaces is connected to a respective external crosspoint port.

16. The apparatus of claim 15, wherein the external transceiver interfaces are of a type selected from the group consisting of Small Form-Factor Pluggable (SFP), SFP+, Quad SFP (QSFP), and QSFP+.

17. The apparatus of claim 15, wherein the internal transceiver interfaces are of a type selected from the group consisting of SFI and XFI.

18. The apparatus of claim 1, wherein the host controller is connected to the crosspoint control interface through a Universal Serial Bus (USB) connection.

19. The apparatus of claim 1, wherein the crosspoint control interface includes an Inter-Integrated Circuit (I2C) bus.

20. The apparatus of claim 1, wherein the logic control interface includes a Peripheral Component Interconnect Express (PCI Express) bus.

* * * * *